F. H. PAGE.
BALANCED AILERON AND PIVOTED CONTROL FOR AIRCRAFT.
APPLICATION FILED MAY 26, 1919.
1,320,341.
Patented Oct. 28, 1919.
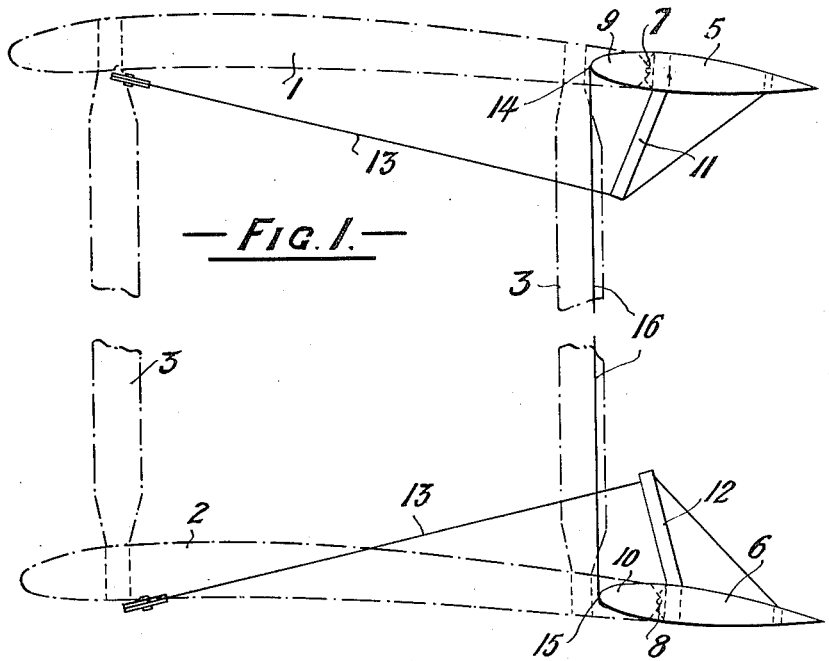
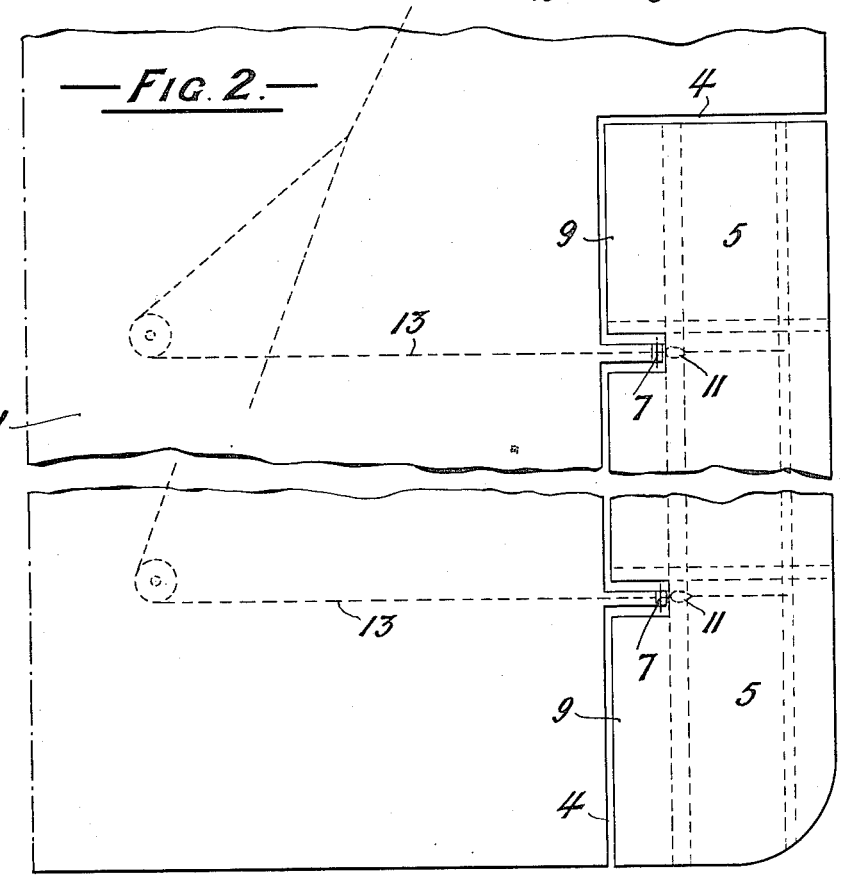
Frederick Handley Page,
Inventor

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

BALANCED AILERON AND PIVOTED CONTROL FOR AIRCRAFT.

1,320,341.     Specification of Letters Patent.     Patented Oct. 28, 1919.

Application filed May 26, 1919. Serial No. 300,003.

*To all whom it may concern:*

Be it known that I, FREDERICK HANDLEY PAGE, a subject of the King of Great Britain, residing at London, England, have invented certain new and useful Improvements in Balanced Ailerons and Pivoted Controls for Aircraft, of which the following is a specification.

The present invention relates to improvements in ailerons, elevators and rudders (hereinafter termed ailerons) of aircraft.

Ailerons have previously been balanced at the point near the center of pressure in order to reduce the controlling effort required to be exerted by the pilot.

According to this invention ailerons are employed which are balanced near their center of pressure, and which are mounted behind fixed wings in such a manner that the after edge of the wing completely shrouds the forward edge of the ailerons, so as to prevent the air traveling over the upper surface of the wing being diverted to the lower surface of the aileron, and the air traveling over the under surface of the wing being diverted to the upper surface of the aileron.

To carry out this condition it is necessary for the after edge of the wing in front of the aileron to be of substantial thickness so that it may shroud the leading edge of the aileron during its movements of angular adjustment up and down due to the rise and fall of the leading edge, by reason of the aileron being pivoted on an axis situated some distance behind its leading edge.

In applying the invention to multiple wings, as for instance in biplanes having upper and lower wings and in box tails when the fixed wings are superposed, the ailerons are operated by kingposts projecting inward, the upper aileron having its kingpost projecting downward and the lower aileron having its kingpost projecting upward. In such an arrangement the kingposts are operated by control cables and an interconnection such as wires or connecting rods is provided for causing both ailerons to move in unison. This enables one cable to move both ailerons in one direction and the other cable to move both ailerons in the opposite direction.

It is obvious that when applying the aileron to a single wing, two control cables and two kingposts will be required to operate it, unless the kingpost is connected by a connecting rod instead of by a cable.

The present invention is more particularly described with reference to the accompanying drawing which shows diagrammatically at Figures 1 and 2 the application of the invention to the ailerons on the wings of a biplane, in elevation and plan view respectively.

The wings 1, 2 of a biplane are shown by way of example carried on interplane struts 3. These wings are cut away at 4 in the usual manner to receive the aileron control surfaces 5 and 6. These surfaces are hinged at 7 and 8 respectively so that portions 9 and 10 of these control surfaces project beyond the pivotal axis, and serve therefore to balance the control surfaces about the pivotal axes 7 and 8, whereby the effort of operation of these control surfaces, which is particularly important in aircraft of large dimensions, is reduced. These parts 9 and 10 are as shown curved or tapered, so that their leading edges 14 and 15 respectively never project into the airstream, but are constantly shrouded by the trailing edge of the wings 1 and 2 ahead of them.

The ailerons 5 and 6 are connected by a wire or rod 16 and are provided with kingposts 11 and 12 which, according to the present invention, are both arranged to project inward toward one another. These kingposts are adapted to support the usual control cables 13.

What I claim as my invention and desire to secure by Letters Patent is:—

1. An aircraft having in combination, wings and balanced ailerons, said wings having trailing edges immediately in front of said balanced ailerons of a thickness equal to the maximum arc described by the leading edge of said ailerons, substantially as set forth.

2. In aircraft, the combination of balanced ailerons having tapered leading edges, and wings in which the trailing edge immediately in front of said ailerons is of sufficient thickness to effectively shroud the tapered leading edge of said ailerons, in whatever position said ailerons may be set, substantially as set forth.

3. Aircraft with multiple wings having balanced ailerons, as in claim 2, wires connecting the leading edges of said ailerons and a kingpost mounted on each of said ailerons said kingposts projecting inward toward the opposite ailerons and cables connected to said kingposts so that said ailerons will move in unison when either aileron is operated through its cable and kingpost.

In witness whereof I have hereunto set my hand in the presence of two witnesses.

FREDERICK HANDLEY PAGE.

Witnesses:
GRIFFITH BREWER,
CYRIL GRIFFITH BREWER.